(12) United States Patent
Kim

(10) Patent No.: US 7,516,337 B2
(45) Date of Patent: Apr. 7, 2009

(54) APPARATUS FOR SUPPLYING POWER TO CONTROLLER

(75) Inventor: Jong-boo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 369 days.

(21) Appl. No.: 11/244,198

(22) Filed: Oct. 6, 2005

(65) Prior Publication Data

US 2006/0090089 A1 Apr. 27, 2006

(30) Foreign Application Priority Data

Oct. 22, 2004 (KR) .................. 10-2004-0084803

(51) Int. Cl.
*G06F 1/00* (2006.01)
*G06F 1/26* (2006.01)
*G06F 1/32* (2006.01)

(52) U.S. Cl. .................. 713/300; 713/320; 713/330; 713/340

(58) Field of Classification Search .................. 713/300
See application file for complete search history.

(56) References Cited

U.S. PATENT DOCUMENTS

| 4,617,473 A | 10/1986 | Bingham |
| 5,306,961 A | 4/1994 | Leo |
| 5,608,273 A | 3/1997 | Bartlett |
| 5,703,415 A | 12/1997 | Tanaka |
| 5,783,964 A | 7/1998 | Eitan |
| 7,024,574 B2 * | 4/2006 | Odaohhara et al. .......... 713/324 |
| 2002/0171295 A1 | 11/2002 | Nitta et al. |
| 2003/0193363 A1 | 10/2003 | Egan |

FOREIGN PATENT DOCUMENTS

| EP | 0 622 883 | 10/1998 |
| KR | 94-11272 | 5/1994 |
| KR | 100250388 B | 4/2000 |
| KR | 100276860 | 10/2000 |
| KR | 2001-0104078 | 11/2001 |

* cited by examiner

*Primary Examiner*—Thomas Lee
*Assistant Examiner*—Michael J Brown
(74) *Attorney, Agent, or Firm*—Roylance, Abrams, Berdo & Goodman, L.L.P.

(57) ABSTRACT

An apparatus for supplying power to a controller has a main power switch provided on a power supply path of a main power to a controller, a sub power switch provided on a power supply path of a sub power to the controller, and a power supply controller that opens the main power switch and closes the sub power switch so that the sub power is supplied to the controller when not receiving the main power. Accordingly, the power supply to the controller can be more stably switched. Additionally, an over-discharged battery is not used in power supply, and the controller can have a more stable reset operation.

10 Claims, 4 Drawing Sheets

APPARATUS FOR SUPPLYING POWER TO CONTROLLER

CROSS-REFERENCE TO RELATED APPLICATIONS

This application claims the benefit under 35 U.S.C. §119(a) of Korean Patent Application No. 2004-84803, filed on Oct. 22, 2004, in the Korean Intellectual Property Office, the entire disclosure of which is hereby incorporated by reference.

BACKGROUND OF THE INVENTION

1. Field of the Invention

The present invention relates to a power supply apparatus. More particularly, the present invention relates to a power supply apparatus which supplies power to a controller using main and sub batteries as a power source.

2. Description of the Related Art

A controller is an element which drives and controls electrical parts according to user instructions, and is often considered to be the most essential part of an electronic device. Even when the electronic device is not in operation, that is, even in a power-off state, the controller sometimes remains operating. For example, the controller may be on to drive a timer to keep user-set time during the power-off of the electronic device.

Accordingly, power supply must continue to supply power even in the power-off of the electronic device. Meanwhile, in a general electronic device, there are two batteries used as a power supply for the electronic device and the controller. In the normal operation, the main battery is used to supply power to the controller. However, in the absence of main battery or main battery discharge, a sub battery is used to supply power to the controller.

FIG. 1 is a circuit diagram of a conventional apparatus for supplying power to the controller. Referring to FIG. 1, the power supply apparatus includes a main battery 10, a sub battery 20 and a diode 30 as a switching element.

In the presence of the main battery 10, power of the main battery 10 is supplied to the controller, while the power of the sub battery 20 is blocked by the diode 30.

In the absence of the main battery 10 or in case of main battery discharge, power is supplied from the sub battery 30 to the controller through the diode 30.

Because only the diode 30 operates to switch supply power to the controller, the power supply switching was not stable enough in the conventional power supply apparatus.

Additionally, when the sub battery 20 is insufficiently charged, that is, when the electrical potential of the sub battery 20 is lower than the potential barrier of the diode 30, power of the main battery 10 is supplied to the controller even when the main battery 10 is discharged. As the discharged battery is used, the lifespan of the battery 10 shortens.

Accordingly, a more stable power switching method of the main and sub batteries 10 and 20 is required, and also, a method to prevent use of main battery 10 in the case of discharge is also required.

Additionally, a method of using a controller power supply apparatus to stabilize reset of the controller, is also required.

SUMMARY OF THE INVENTION

The present invention has been developed to overcome the above-mentioned problems of the related art, and accordingly, it is an object of the present invention to provide an apparatus for supplying power to a controller, which provides more stable power supply switching to a controller, prevents use of an over-discharged battery as a power supply, and stabilizes reset operation of the controller.

The above aspects and/or other features of the present invention can be substantially achieved by providing a power supply apparatus, comprising a main power switch provided on a power supply path of a main power to a controller, a sub power switch provided on a power supply path of a sub power to the controller, and a power supply controller. When not receiving the main power, the power supply controller opens the main power switch and closes the sub power switch so that the sub power is supplied to the controller.

When the main power is under a predetermined level, the power supply controller opens the main power switch so that the main power is not supplied to the controller, and closes the sub power switch so that the sub power is supplied to the controller.

When both the main and sub powers are received, the power supply controller opens the sub power switch so that the sub power is not supplied to the controller, and closes the main power switch so that the main power is supplied to the controller.

The power supply controller may include a main power detector. When the power supply controller receives the main power, the main power detector outputs a main power detect signal. A main power switching controller opens the main power switch so that the main power is not supplied to the controller when not receiving the main power detect signal from the main power detector. A sub power detector outputs a sub power detect signal when receiving the sub power. A sub power switching controller closes the sub power switch so that the sub power is supplied to the controller when not receiving the main power detect signal from the main power detector and receiving the sub power detect signal from the sub power detector.

The main power detector does not output the main power detect signal when the received main power is under a predetermined level.

When receiving the main power detect signal from the main power detector and the sub power detect signal from the sub power detector, the sub power switching controller opens the sub power switch so that the sub power is not supplied to the controller.

Additionally, a reset controller is preferably provided which generates and sends a reset signal to the controller when receiving one of the main and sub powers, and generates the reset signal using the main power and sends the generated reset signal to the controller when receiving both the main and sub powers at the same time.

The reset controller preferably includes a main power charger that is charged by the main power, a sub power charger that is charged by the sub power, and a reset signal generator for generating the reset signal and sending the generated reset signal to the controller when one of a main power charge amount of the main power charger and a sub power charge amount of the sub power charger exceeds a predetermined threshold.

The main power charger is preferably charged faster than the sub power charger.

A time constant of the main power charger is preferably lower than that of the sub power charger.

The main power is preferably supplied from a main battery, and the sub power is preferably supplied from a sub battery.

BRIEF DESCRIPTION OF THE DRAWINGS

The above aspects and features of the present invention will be more apparent by describing certain embodiments of the present invention with reference to the accompanying drawings, in which.

Throughout the drawings, like reference numbers will be understood to refer to like elements, features and structures.

DETAILED DESCRIPTION OF EXEMPLARY EMBODIMENTS

Certain embodiments of the present invention will now be described in greater detail with reference to the accompanying drawings.

The matters defined in the description such as a detailed construction and elements are provided to assist in a comprehensive understanding of the invention. Thus, it is apparent that various changes and modifications to the embodiments described herein can be made without departing from the scope and spirit of the present invention. Also, descriptions of well-known functions or constructions are omitted for clarity and conciseness.

Figure 1:
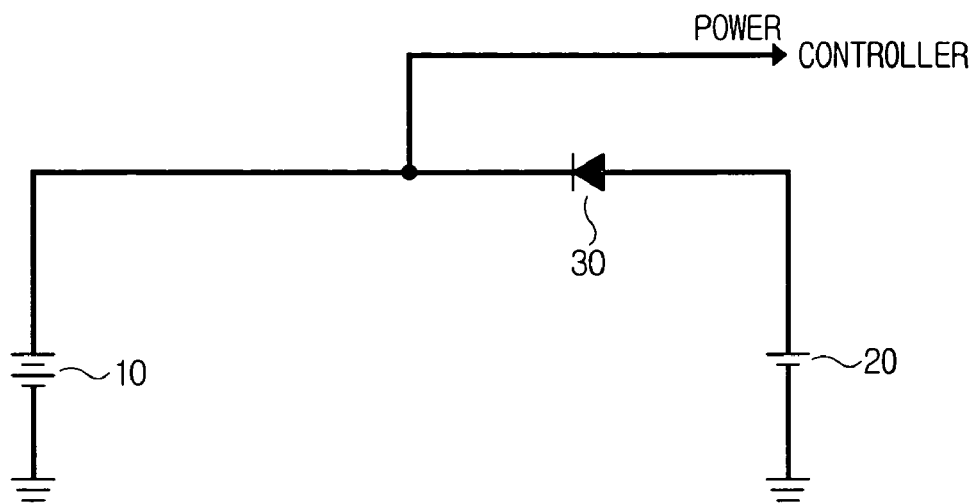
FIG. 1 is a circuit diagram of a conventional apparatus for supplying power to a controller.
Figure 2:
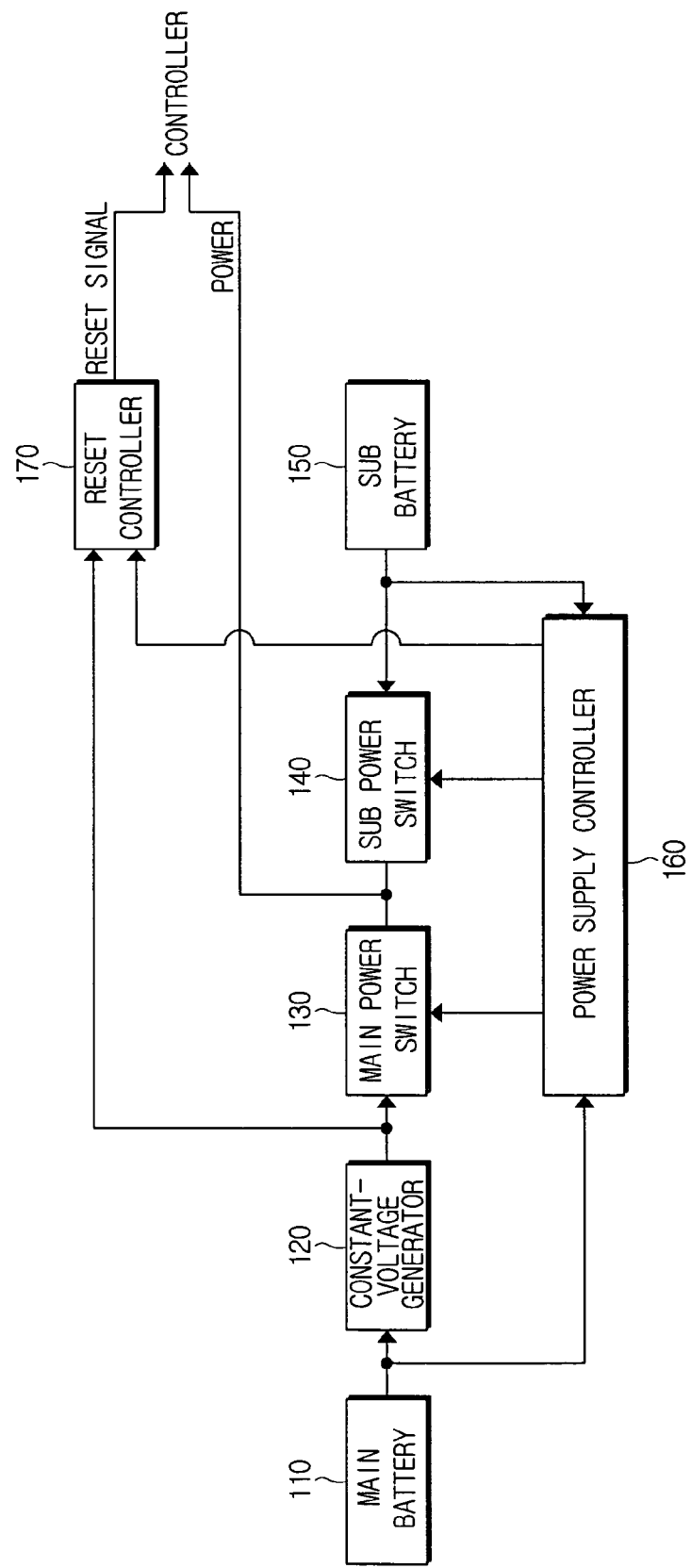
FIG. 2 is a block diagram of an apparatus for supplying power to a controller according to an embodiment of the present invention.

FIG. 2 is a block diagram of an apparatus for supplying power to a controller according to an embodiment of the present invention.

Referring to FIG. 2, the power supplying apparatus includes a constant-voltage generator 120, a main power switch 130, a sub power switch 140, a power supply controller 160 and a reset controller 170.

Main and sub batteries 110 and 150 are provided to the power supply apparatus, with the sub battery 150 preferably being rechargeable with power from the main battery 110. The constant-voltage generator 120 regulates power from the main battery 110 to a constant level of voltage and outputs the regulated voltage.

For the convenience of explanation, the terms 'power from the main battery 110' and 'power from the constant-voltage generator 120' will both be referred to as the 'main power'.

The main power switch 130 is positioned on the main power supply path to the controller. When the main power switch 130 is closed (that is, switched on), main power is supplied to the controller. When the main power switch 130 is open (that is, switched off), main power is not supplied to the controller.

The sub power switch 140 is positioned on a sub power supply path from the sub battery 150 to the controller. The term 'sub power' refers to the 'power from the sub battery 150'. When the sub power switch 140 is closed (that is, switched on), sub power is supplied to the controller. When the sub power switch 140 is open (that is, switched off), sub power is not supplied to the controller.

The power supply controller 160 controls switching operations of the main power switch 130 and the sub power switch 140, and determines the type of power to be supplied to the controller. In other words, the power supply controller 160 operates such that the main and sub powers can be selectively supplied to the controller.

In more detail, when the main power is not supplied (that is, in the absence of main battery 110), the power supply controller 160 opens the main power switch 130, while closing the sub power switch 140. As a result, sub power is supplied to the controller.

Likewise, when the main power is below a predetermined level, such as 3.0V, the power supply controller 160 may also open the main power switch 130 to block main power supply from the controller and close the sub power switch 140 to supply sub power to the controller. By doing so, the main battery 110, when discharged below a predetermined level, can be prevented from further use, and therefore, the lifespan of the main battery 110 can advantageously be prolonged.

Additionally, when both the main and sub powers are supplied, the power supply controller 160 opens the sub power switch 140 to block sub power from being supplied to the controller and closes the main power switch 130 to supply only the main power to the controller.

Additional features and aspects of the power supply controller 160 will now be described in further detail.

The reset controller 170 operates to control reset initiation of the controller. That is, the reset controller 170 generates a reset signal and supplies the generated reset signal to the controller so that controller can begin reset operation, when none of the main and sub powers has been received and then at least one of the main and sub powers begins to be supplied.

More particularly, the reset controller 170 generates a reset signal using main power in the case when there is no power supplied at all, and then i) when both main and sub powers are simultaneously supplied, or ii) when the main power is supplied to charge the sub battery 150 and therefore, causes supply of both main and sub powers. The reset controller 170 controls reset initiation of the controller based on the main power, such that a reset operation can be initiated after the controller and the other elements are completely set up and therefore, stabilized by the main power.

The reset controller 170 will be described in greater detail below.

In the following, the power supply controller 160 will be described in detail with reference to FIG. 3.

Figure 3:
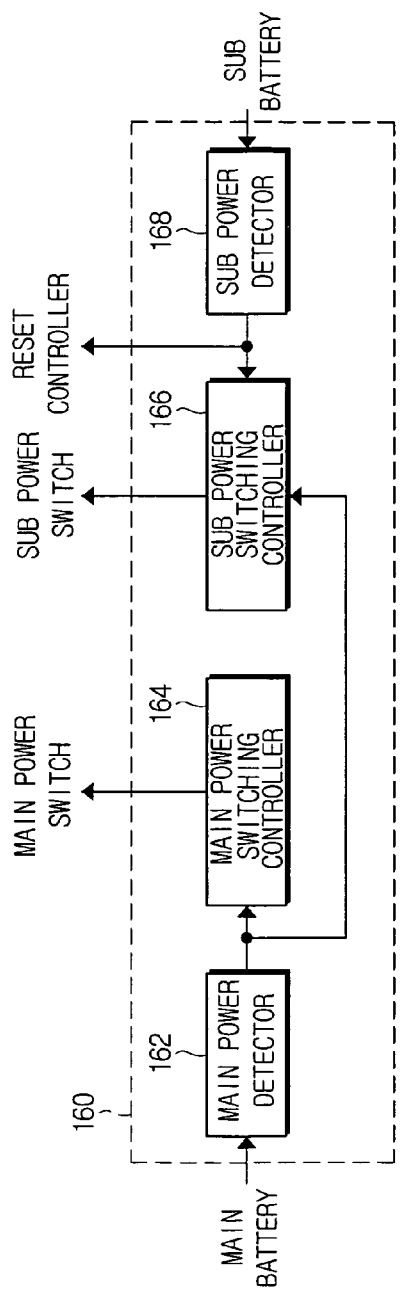
FIG. 3 is a detailed block diagram of the power supply controller of FIG. 2.

FIG. 3 is a detailed block diagram of the power supply controller 160. Referring to FIG. 3, the power supply controller 160 includes a main power detector 162, a main power switching controller 164, a sub power switching controller 166 and a sub power detector 168.

With the application of main power, that is, with the mounting of the main battery 110, the main power detector 162 outputs a main power detect signal to the main/sub switching controllers 164 and 166. When the main power is not supplied, that is, when the main battery 110 is not mounted, the main power detector 162 does not output the main power detect signal. Additionally, the main power detector 162 also does not output a main power detect signal when the main power is below a predetermined level such as 3.0V.

When the main power detect signal is received from the main power detector 162, the main power switching controller 164 closes the main power switch 130 to supply the main power to the controller. When the main power detect signal is not received from the main power detector 162, the main power switching controller 164 opens the main power switch 130 to block supply of main power from inputting to the controller.

When sub power is received, that is, when the sub battery 150 is charged enough by the main battery 110, the sub power detector 168 outputs a sub power detect signal to the sub power switching controller 166. When sub power is not received, that is, when the sub battery 150 is insufficiently charged by the main battery 110, the sub power detector 168 does not output a sub power detect signal.

When the main power detect signal is not output from the main power detector 162, and the sub power detect signal is output from the sub power detector 168, the sub power switching controller 166 closes the sub power switching 140 so that the sub power can be supplied to the controller. When the main power detect signal is outputted from the main power detector 162 and the sub power detect signal is outputted from the sub power detector 168, the sub power switching controller 166 opens the sub power switch 140 to block the sub power from the controller.

Figure 4:
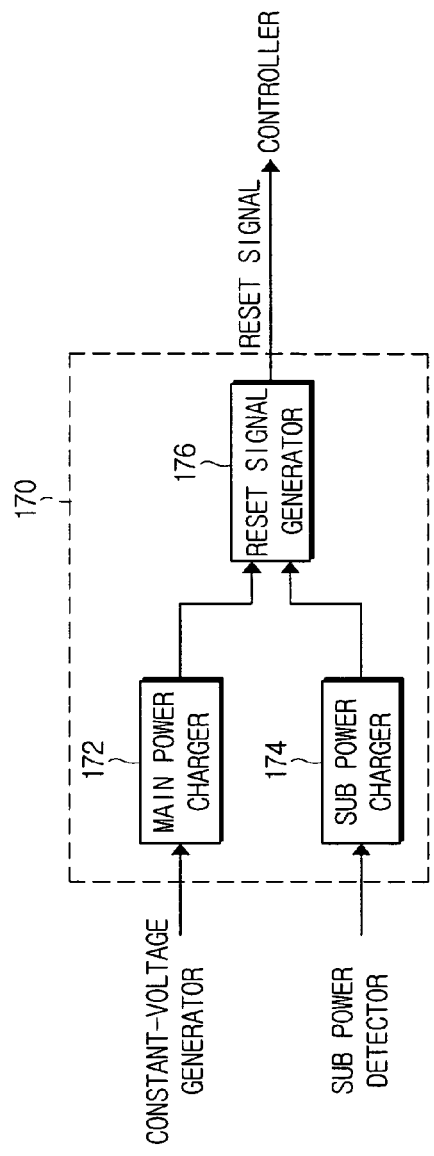
FIG. 4 is a detailed block diagram of the reset controller of FIG. 2.

The reset controller 170 will now be described in greater detail with reference to FIG. 4. FIG. 4 shows a detailed block diagram of a reset controller 170. Referring to FIG. 4, the reset controller 170 includes a main power charger 172 a sub power charger 174 and a reset signal generator 176.

The main power charger 172 is charged by the main power which is supplied from the constant-voltage generator 120, and the sub power charger 174 is charged by the sub power which is supplied from the sub power detector 168.

The time constant of the main power charger 172 is preferably lower than that of the sub power charger 174. Accordingly, the main power charger 172 is charged with greater speed than the sub power charger 174.

The reset signal generator 176 generates and sends out a reset signal to the controller when one of the charge amount of the main power charger 172 (hereinafter called 'main power charge amount') and the charge amount of the sub power charger 174 (hereinafter called 'sub power charge amount') exceeds a predetermined threshold. The main power charger 172 is preferably charged faster than the sub power charger 174. Accordingly, when both the main and sub powers are received, the reset signal generator 176 generates a reset signal according to the main power charger 172 which is charged faster than the sub power charger 174.

Figure 5:
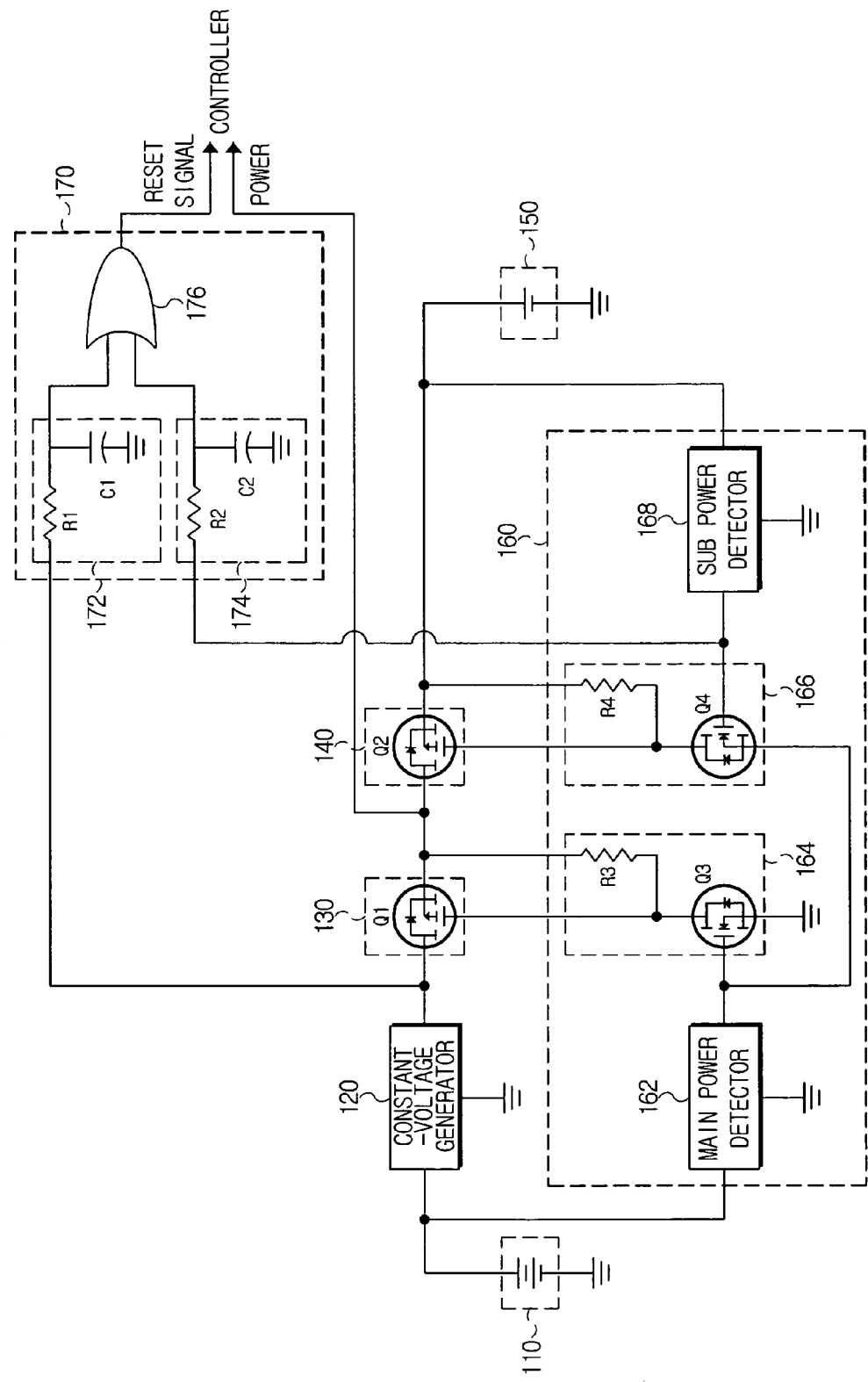
FIG. 5 is a circuit diagram of an apparatus for supplying power to a controller according to an embodiment of the present invention.

A detailed circuit structure of the controller power supply apparatus according to an embodiment of the present invention will be described below. FIG. 5 is a circuit diagram of the controller power supply apparatus according to an embodiment of the present invention.

In comparing the power supply apparatuses of FIGS. 2 and 5, first and second transistors Q1 and Q2 are employed in FIG. 5 instead of the main and sub power switches 130 and 140 of FIG. 2. Additionally, in comparing FIGS. 3 and 5, third and fourth transistors Q3 and Q4, and third and fourth resistors R3 and R4 for sending bias power to the third and fourth transistors Q3 and Q4 are employed in FIG. 5 instead of the main and sub power switching controllers 164 and 166 of FIG. 3. Furthermore, in comparing FIGS. 4 and 5, first and second resistors R1 and R2 and first and second capacitors C1 and C2 connected to the first and second resistors R1 and R2 are employed in FIG. 5 instead of the main and sub power chargers 172 and 174 of FIG. 4, and an OR gate is employed in FIG. 5 instead of the reset signal generator 176 of FIG. 4.

The first and second transistors Q1 and Q2 are turned on when voltage difference between gate and source ends is 'low'. The third and fourth transistors Q3 and Q4 are turned on when the voltage difference between gate and source ends is 'high'.

The circuit operation of the power supply apparatus according to an embodiment of the invention will now be described mainly with respect to i) power supply when both main and sub powers are received, ii) power supply when only the sub power is received, and iii) reset operation control of the controller.

First, it will be described with reference to the power supply when both main and sub powers are received.

Because the main power is received, the main power detector 162 generates a signal with 'high' logic level as the main power detect signal. The main power detector 162 sends out the 'high'-logic signal to the gate end of the third transistor Q3 of the main power switching controller 164 and to the source end of the fourth transistor Q4 of the sub power switching controller 166.

Meanwhile, because the sub power is also received, the sub power detector 168 generates a signal with 'high' logic level as the sub power detect signal, and outputs the generated signal to the gate end of the fourth transistor Q4 of the sub power switching controller 166.

As the 'high'-logic level signal is received at the gate end, the third transistor Q3, having the source end grounded, is turned on, and as a result, the gate end of the first transistor Q1 as the main power switch 130 is grounded. Accordingly, the first transistor Q1, having 'low' voltage difference between gate and source ends, is turned on, and the main power from the constant-voltage generator 120 is sent to the controller.

On the contrary, the fourth transistor Q4, which receives 'high'-logic level signal at both the gate and source ends, is turned off, and as a result, the second transistors Q2 as the sub power switch 140 has 'high' voltage difference between gate and source ends. Accordingly, the second transistor Q2 is turned off, and the sub power of the sub battery 150 is not supplied to the controller.

Next, the power supply when only the sub power is received, will be described.

Because there is no main power received, the main power detector 162 generates a signal with 'low'-logic level as a main power non-detect signal. The main power detector 162 then outputs the generated 'low'-logic signal to the gate end of the third transistor Q3 of the main power switching controller 164 and to the source end of the fourth transistor Q4 of the sub power switching controller 166.

Because the sub power is received, the sub power detector 168 generates a signal with 'high'-logic level as the sub power detect signal, and outputs the generated signal to the gate end of the fourth transistor Q4 of the sub power switching controller 166.

As the 'low'-logic level signal is received at the gate end, the third transistor Q3, having the source end grounded, is turned off, and as a result, the first transistor Q1 as the main power switch 130 has a 'high' voltage difference between gate and source ends. Accordingly, the first transistor Q1 is turned off, and the main power of the constant-voltage generator 120 is not supplied to the controller.

On the contrary, as the 'high'-logic level signal is received at the gate end and 'low'-logic level signal is received at the source end, the fourth transistor Q4 is turned on, and as a result, the second transistor Q2 as the sub power switch 140 has the gate end grounded. Accordingly, the second transistor Q2 having 'low' voltage difference between gate and source ends, is turned on, and the sub power of the sub battery 150 is supplied to the controller.

Next, the reset operation control of the controller by the power supply apparatus according to an embodiment of the present invention will be described with reference to two scenarios. First, a scenario when none of the main and sub powers has been received (because the main battery 110 is not mounted and the mounted sub battery 150 is in discharged state) will be described. Next, a scenario when the main power is received (that is, when the main battery 110 is mounted) will be described.

With the supply of the main power, the first capacitor C1 of the main power charger 172 is charged by the main power which is flowing through the first resistor R1.

Because the sub battery 150 is charged by the main power, the sub power is supplied to the sub power charger 174. Accordingly, the second capacitor C2 of the sub power charger 174 is charged by the sub power which is flowing through the second resistor R2.

Meanwhile, the time constant of the main power charger 172 (that is, the time constant according to the first capacitor C1 and the first resistor R1) is lower than that of the sub power charger 174 (that is, the time constant according to the second capacitor C2 and the second resistor R2). Accordingly, the first capacitor C1 is charged faster than the second capacitor C2. As a result, when the charge amount of the first capacitor C1 exceeds a predetermined threshold, the OR gate as the reset signal generator 176 generates a reset signal and sends the reset signal to the controller.

As described above with reference to exemplary embodiments of the present invention, the power supply to the controller can be more stably switched. Additionally, because an over-discharged battery is not used for power supply, the battery can have a prolonged lifespan. Furthermore, the controller can have a more stable reset operation.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A power supply apparatus, comprising:
    a main power switch provided on a power supply path of a main power to a controller;
    a sub power switch provided on a power supply path of a sub power to the controller; and
    a power supply controller adapted to open the main power switch and close the sub power switch so that the sub power is supplied to the controller when not receiving the main power; and
    a reset controller, after receiving power from both the main power and sub power, generates a reset signal using the main power and sends the generated reset signal to the controller.

2. The power supply apparatus of claim 1, wherein, when the main power is less than a predetermined level, the power supply controller opens the main power switch so that the main power is not supplied to the controller, and closes the sub power switch so that the sub power is supplied to the controller.

3. The power supply apparatus of claim 2, wherein, when both the main and sub powers are received, the power supply controller opens the sub power switch so that the sub power is not supplied to the controller, and closes the main power switch so that the main power is supplied to the controller.

4. The power supply apparatus of claim 1, wherein the power supply controller comprises:
    a main power detector adapted to output a main power detect signal when receiving the main power;
    a main power switching controller adapted to open the main power switch so that the main power is not supplied to the controller when not receiving the main power detect signal from the main power detector;
    a sub power detector adapted to output a sub power detect signal when receiving the sub power; and
    a sub power switching controller adapted to close the sub power switch so that the sub power is supplied to the controller when not receiving the main power detect signal from the main power detector and receiving the sub power detect signal from the sub power detector.

5. The power supply apparatus of claim 4, wherein the main power detector does not output the main power detect signal when the received main power is under a predetermined level.

6. The power supply apparatus of claim 5, wherein the sub power switching controller opens the sub power switch so that the sub power is not supplied to the controller when receiving the main power detect signal from the main power detector and the sub power detect signal from the sub power detector.

7. The power supply apparatus of claim 1, wherein the reset controller comprises;
    a main power charger charged by the main power;
    a sub power charger charged by the sub power; and
    a reset signal generator for generating the reset signal and sending the generated reset signal to the controller when one of a main power charge amount of the main power charger and a sub power charge amount of the sub power charger exceeds a predetermined threshold.

8. The power supply apparatus of claim 7, wherein the main power charger is charged faster than the sub power charger.

9. The power supply apparatus of claim 8, wherein a time constant of the main power charger is lower than that of the sub power charger.

10. The power supply apparatus of claim 1, wherein the main power is supplied from a main battery, and the sub power is supplied from a sub battery.

* * * * *